(12) United States Patent
Valentini (10) Patent No.: US 7,947,099 B2
(45) Date of Patent: May 24, 2011

(54) DUST SUCTION DEVICE WITH SELF-CLEANING OF THE FILTERS

(76) Inventor: Guido Valentini, Milan (IT)

(*) Notice: Subject to any disclaimer, the term of this patent is extended or adjusted under 35 U.S.C. 154(b) by 368 days.

(21) Appl. No.: 12/129,220

(22) Filed: May 29, 2008

(65) Prior Publication Data

US 2009/0000485 A1   Jan. 1, 2009

(30) Foreign Application Priority Data

Jun. 1, 2007   (IT) .............................. MI2007A1121

(51) Int. Cl.
*B01D 46/42* (2006.01)
(52) U.S. Cl. ................................ 55/283; 55/284; 55/302
(58) Field of Classification Search .................... 55/283, 55/284, 302, 318, 321, 322, 287, 467, 294; 95/20, 279, 280; 96/403, 427; 60/295, 296, 60/300, 303, 311
See application file for complete search history.

(56) References Cited

U.S. PATENT DOCUMENTS

| | | | | |
|---|---|---|---|---|
| 4,373,330 A | * | 2/1983 | Stark | 60/311 |
| 5,347,809 A | * | 9/1994 | Moeckel et al. | 60/274 |
| 7,438,735 B2 | * | 10/2008 | Kelsey | 55/283 |
| 2002/0035920 A1 | * | 3/2002 | Everingham et al. | 95/11 |
| 2005/0011036 A1 | | 1/2005 | McCutchen | |
| 2009/0151572 A1 | * | 6/2009 | Ferguson et al. | 96/427 |

FOREIGN PATENT DOCUMENTS

| | | |
|---|---|---|
| DE | 10101219 A1 | 7/2002 |
| EP | 1230973 A | 8/2002 |
| GB | 1284894 A | 8/1972 |

* cited by examiner

*Primary Examiner* — Duane Smith
*Assistant Examiner* — Minh-Chau Pham
(74) *Attorney, Agent, or Firm* — Michael Best & Friedrich LLP (57) ABSTRACT

Described is a dust suction device, preferably for surface working tools, including a turbine, two filters, an inlet chamber containing the two filters provided with an air inlet and in communication with a depression chamber which is in turn in communication with the inlet to the turbine, and an outlet chamber in communication with the outlet from the turbine and with the inlet chamber and provided with an air outlet towards the outside environment. A first valve for each filter is interposed between the inlet chamber and the depression chamber, and a second valve for each filter is interposed between the outlet chamber and the inlet chamber and are operable so that an air flow from the inlet chamber may pass through each of the filters during a suction step and an air flow from the outlet chamber may pass through each of the filters during a filter cleaning step.

22 Claims, 10 Drawing Sheets

DUST SUCTION DEVICE WITH SELF-CLEANING OF THE FILTERS

RELATED DOCUMENTS

This document claims priority from Italian Patent Application No. MI2007A 001121, filed on Jun. 1, 2007, which is incorporated by reference herein.

BACKGROUND

The present invention relates to a dust suction device with self-cleaning of the filters.

In order to avoid excessive pressure losses because of the clogging of the filters, dust suction devices with filtering systems and mechanisms for the flow inversion for the transitory cleaning of the filters are known. Dust suction devices with two filters having mechanisms for cleaning the filters which alternately allow to clean one of the filters without interrupting the suction operation of the other are also known.

SUMMARY

However, dust suction devices with two filters which are alternately cleaned while continuously working, provided with separate valves for each filter and independently operable so as to allow the suction device to be provided with an adjustable control for the flow inversion are not known.

Therefore, it is the object of the present invention to provide a two filter dust suction device including the adjustable control for the flow inversion in the filters themselves.

According to the invention, this object is achieved by a dust suction device, preferably for surface working tools, including a turbine, two filters, an inlet chamber containing the two filters provided with an air inlet and in communication with a depression chamber which is in turn in communication with the inlet to the turbine, at the outlet from the turbine an outlet chamber in communication with the outlet from the turbine and with said inlet chamber and provided with an air outlet towards the outside environment and valve means interposed between said inlet chamber and said depression chamber and between said outlet chamber and said inlet chamber and operable so that an air flow from the inlet chamber may pass through each of said filters during a suction step, and an air flow from the outlet chamber may pass through each of said filters during a filter cleaning step, characterised in that said valve means include a first valve interposed between the inlet chamber and the depression chamber and a second valve interposed between the outlet chamber and the inlet chamber for each filter.

The two valves may be operated by a single control or by two separate controls.

These and other features of the present invention will become more apparent from the following detailed description of two practical embodiments thereof, shown by no way of limitation in the accompanying drawings.

DETAILED DESCRIPTION

Figure 1:
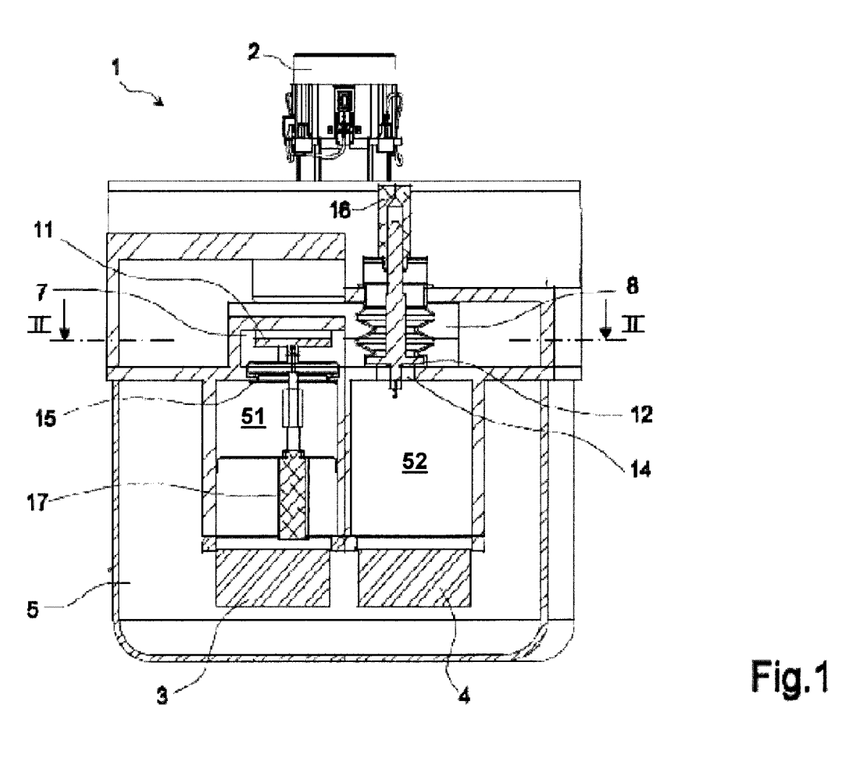
FIG. 1 shows a vertical section view along line I-I in FIG. 2 of an embodiment with separate controls in an operating step with both filters in a suction step.
Figure 3:
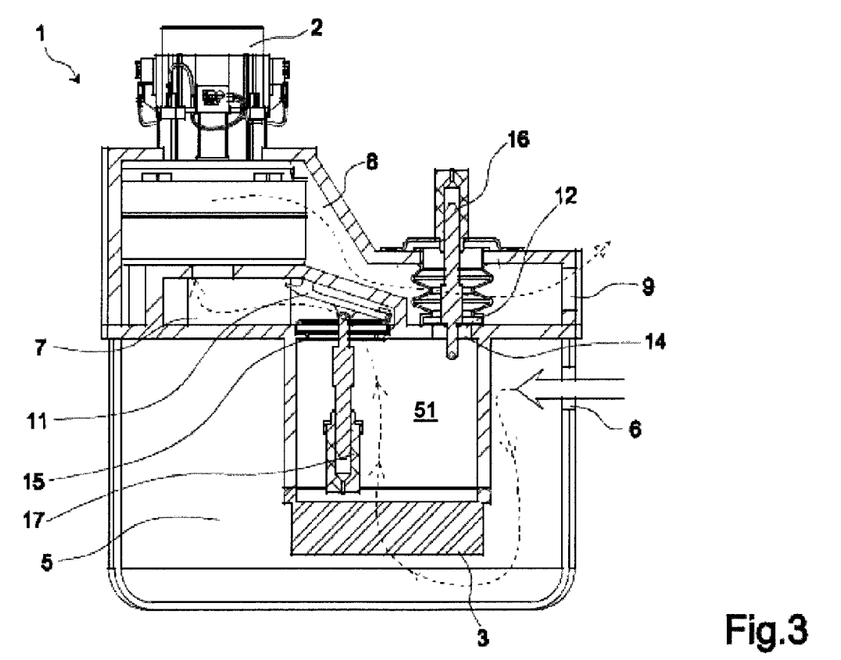
FIG. 3 shows a vertical section view along line III-III in FIG. 2.

FIGS. 1 and 3 show a dust suction device 1 including a turbine 2, two planar filters 3 and 4, an inlet chamber 5 shared by the two filters with air inlet 6 from the outside environment, intermediate chambers 51 and 52, a depression chamber 7 shared by the two filters, which conveys the aspirated air into the turbine 2, an outlet chamber 8 shared by the two filters, which conveys the air from the turbine 2 to the outside environment by means of an outlet 9, and valve means, specifically two first valves 11, one for each filter, with stop seat and communication holes 15, which control the connection between the intermediate chambers 51 and 52 and the depression chamber 7, two second valves 12, one for each filter, with stop seat and communication holes 14, which control the connection between the outlet chamber 8 and the intermediate chambers 51, 52. The first valves 11 are each provided with an independent control 17, consisting of a solenoid in this embodiment. The second valves 12 are each provided with an independent control 16, also consisting of a solenoid in this embodiment.

Figure 2:
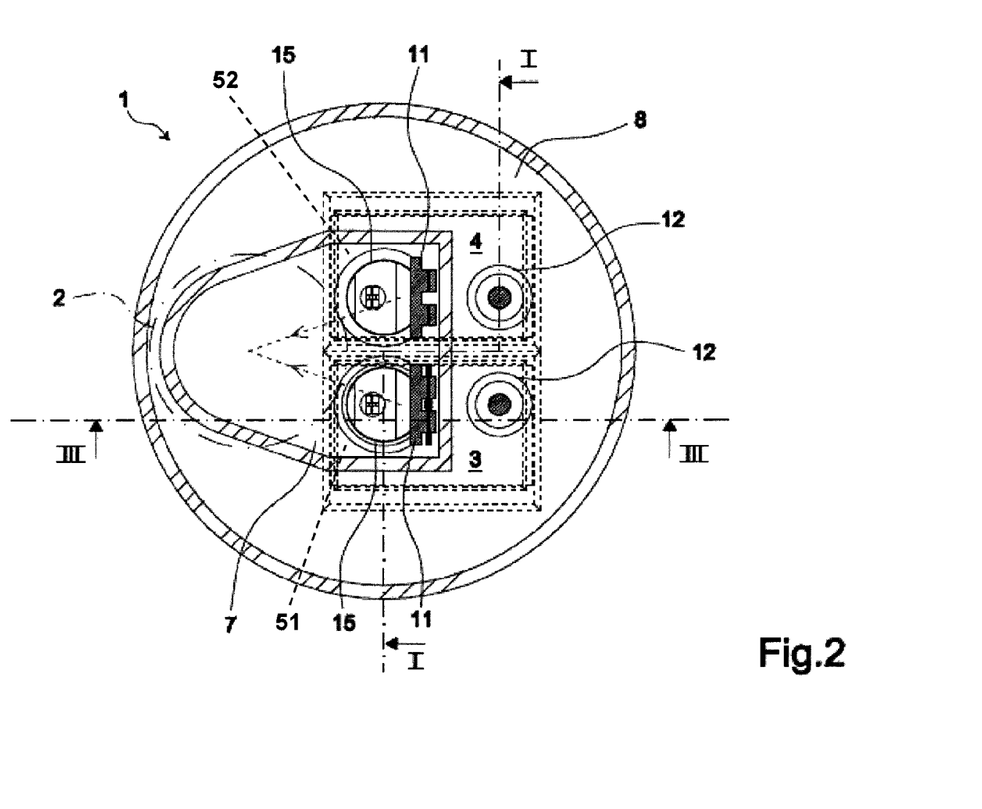
FIG. 2 shows a horizontal section view along line II-II in FIG. 1.

The normal operation of the dust suction device 1 during suction may be noted with reference to FIGS. 2 and 3. The air enters the inlet chamber 5 through the inlet 6, it passes through the filter 3 depositing dust on the outer part, and reaches the depression chamber 7 through the first valve 11 which is held open by a return spring (not shown in the drawings) and is then aspirated into the turbine 2. At the outlet of the turbine 2, the air is conveyed from the outlet chamber 8, where an overpressure is generated, to the outlet 9 towards the outside environment. It may be noted that the second valve 12 is closed by gravity and does not allow the passage of air from the outlet chamber 8 towards the inlet chamber 5. During this step, the operation of filter 3 is equivalent to that of filter 4, and the same is for the operation of the corresponding valves and controls.

Figure 4:
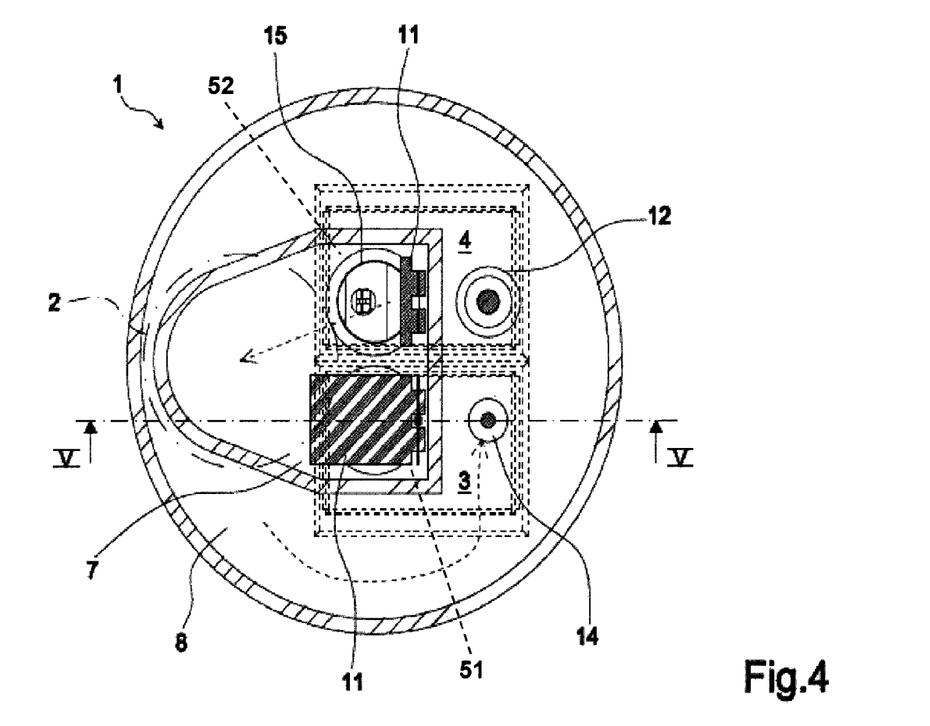
FIG. 4 shows a horizontal section view such as that in FIG. 2 with a filter during a suction step and the other during a cleaning step.
Figure 5:
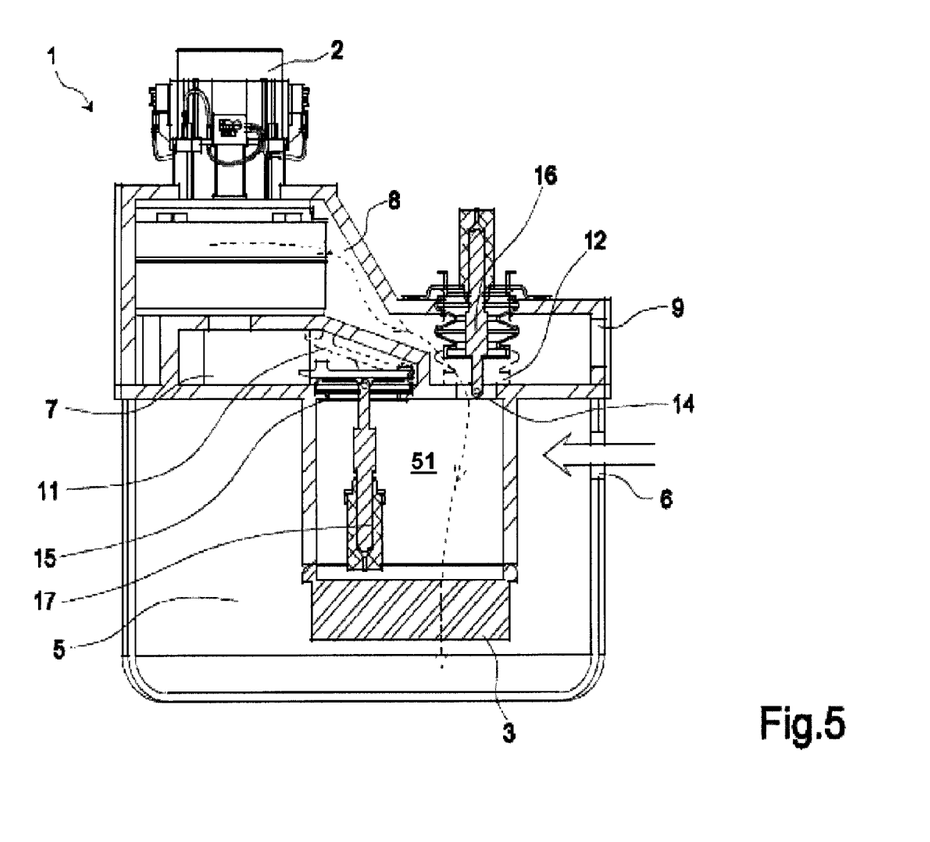
FIG. 5 shows a vertical section view along line V-V in FIG. 4.
Figure 6:
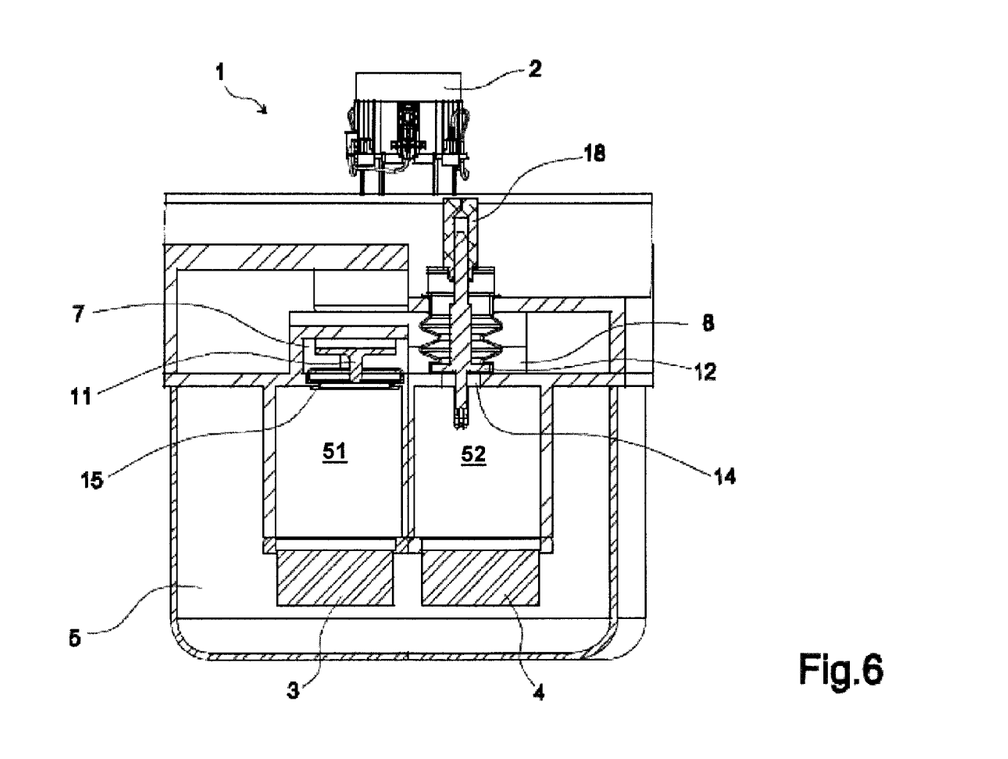
FIGS. 6-10 show views similar to those in FIGS. 1-5 relating to an embodiment with a single control valve.
Figure 7:
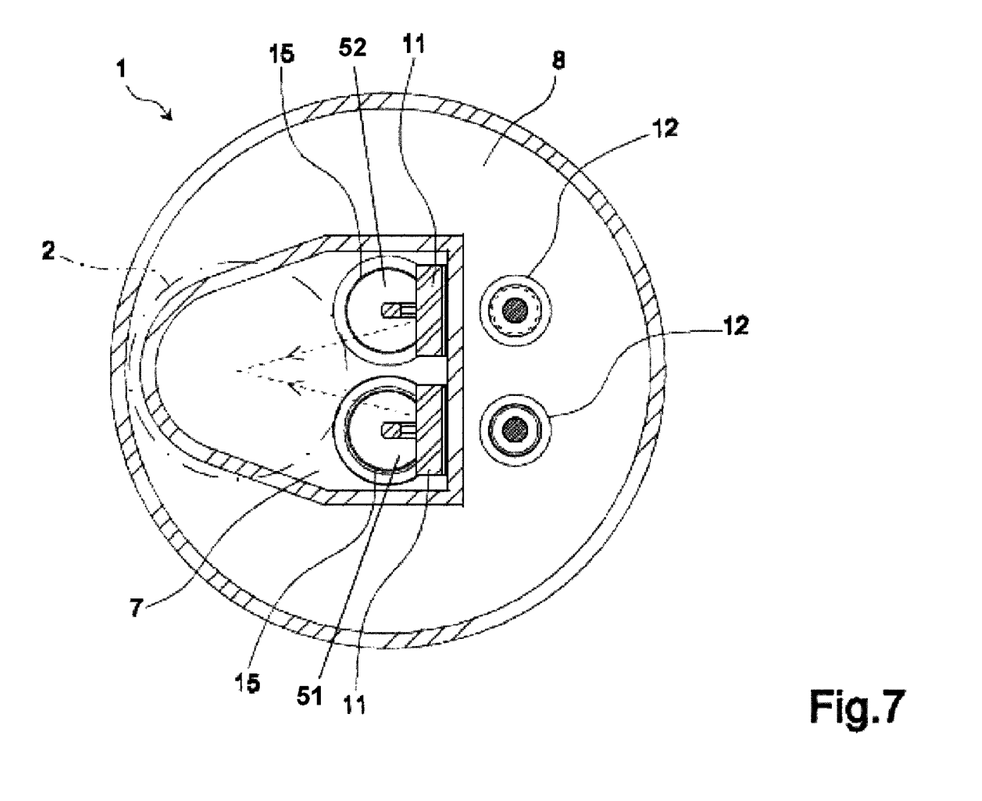
Figure 8:
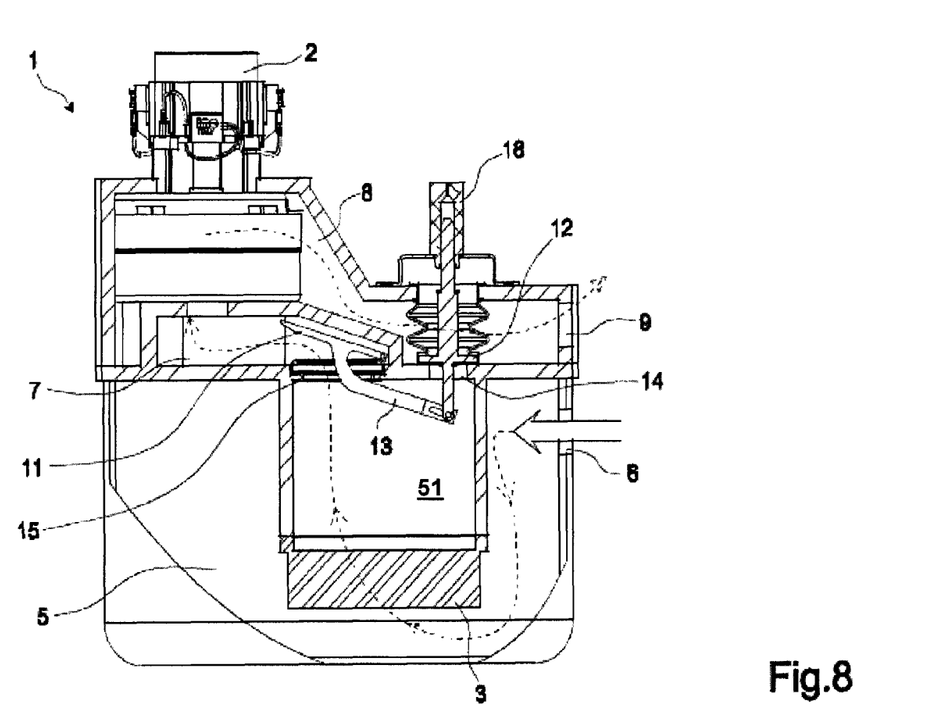
Figure 9:
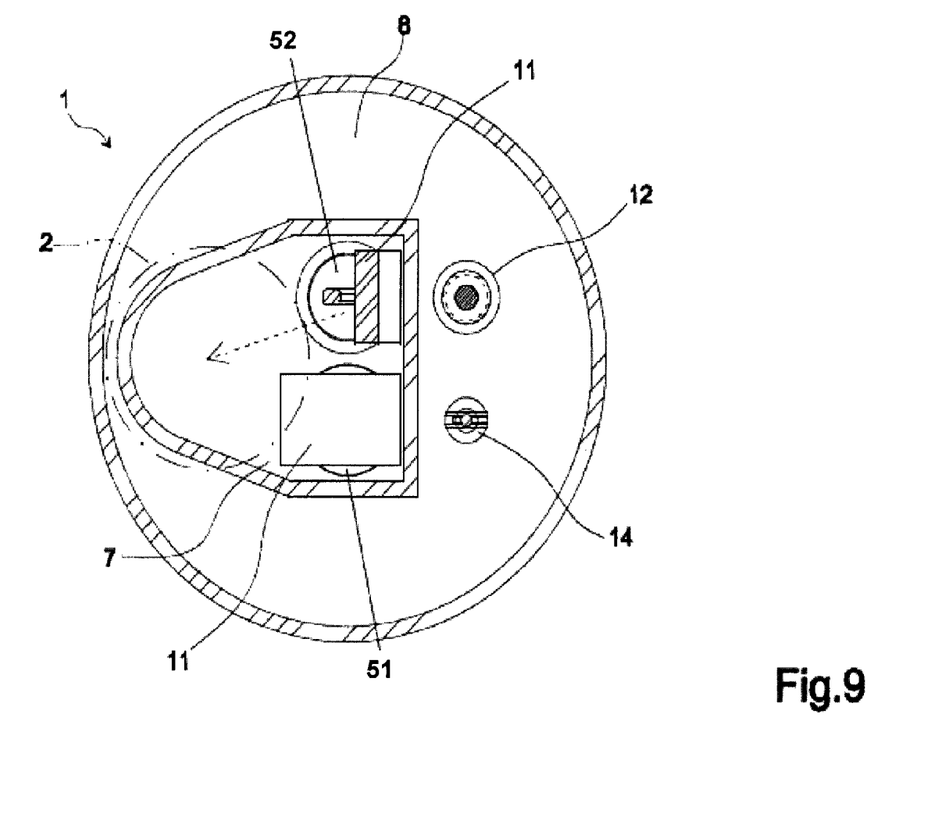
Figure 10:
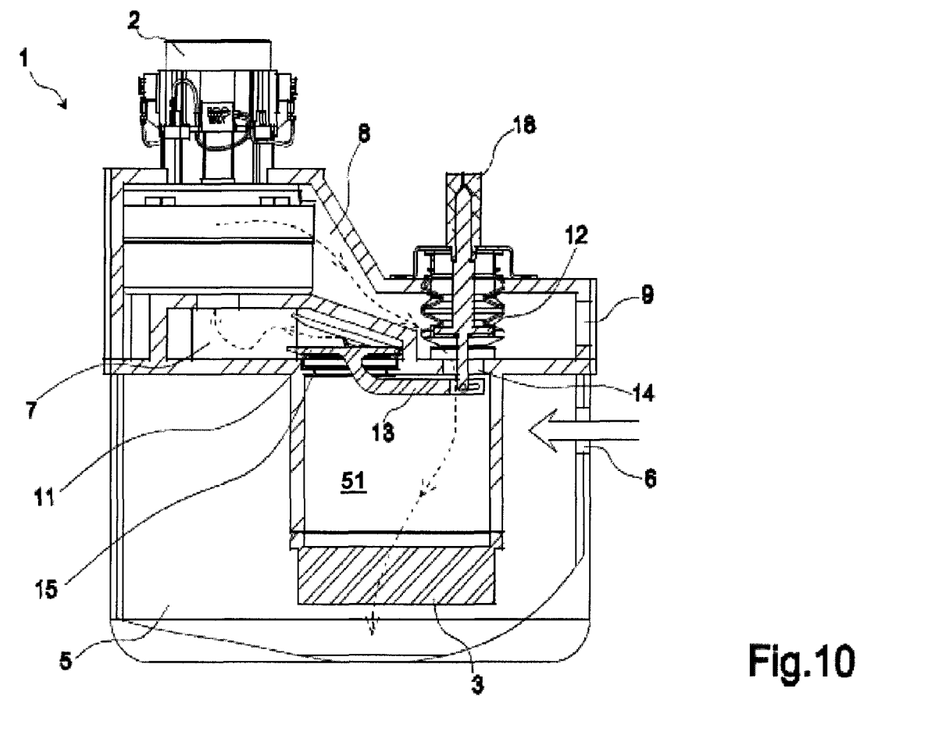

Now, the operation of the dust suction device 1 during the step of cleaning one filter may be noted with reference to FIGS. 4 and 5. During this step one of the two filters normally operates during suction and the other undergoes the filter cleaning operation. For the sake of simplicity, the filter 3 is considered while cleaning and the filter 4 while normally operating. Obviously, all of the following considerations concerning filter 3 also apply to filter 4 when undergoing cleaning.

It should be noted that, during the step of cleaning the filter 3, the air cannot flow from the inlet chamber 5 through the filter 3 to the depression chamber 7, shared by the two filters, as the first valve 11 related to the filter 3 is closed during this step by the related solenoid control 17. However, the turbine 2 is fed by the air incoming through the filter 4, in the normal suction operation and, also in this case, an overpressure is generated in the outlet chamber 8, which is also shared by the two filters. The second valve 12 is opened by the corresponding independent solenoid control 16 thus leading the outlet chamber 8 to be in communication with the inlet chamber 5 by means of the filter 3, which is being cleaned. Therefore, an air flow coming from the outlet chamber 8 and directed to the inlet chamber 5, which moves dust excess on the outer surface thereof in contact with the dusty air of the inlet chamber 5, passes through the filter 3, thus cleaning the filter 3 itself.

The alternate filter cleaning operation may be manually actuated, otherwise the appropriate opening and closing of the valves 11 and 12 may be controlled by an electronic control unit (not shown), especially when the valves 11 and 12 and the corresponding solenoids 17 and 16 are electronically controlled valves, and may advantageously be led to depend on time criteria. In this case, the opening and closing of the valves 11 and 12 may be actuated synchronously (that is one opens while the other closes and vice versa) or by controls sequential in time. Sensors, such as pressure sensors, may also be provided, signalling a load loss when the filters are passed through, indicating the need for cleaning. The sensors may advantageously signal minimum or maximum pressure thresholds beyond which the valves 11 and 12 are opened or closed in order to obtain an effective cleaning of the filters 3 and 4.

For instance, a marked load loss signalled by the pressure sensors on one filter may signal that the same should be cleaned.

A further actuation criterion for cleaning the filters may be set by a predetermined threshold level of the continuous operation time of the suction device.

Now referring to FIGS. 6 to 10, an embodiment is noted in which the control of the first valve 11 of the filter 3 and of the second valve 12 of the same filter are integrated in a single control 18, which in the disclosed embodiment consists of a solenoid directly controlling the second valve 12 and, by means of a mechanical linkage 13, the first valve 11. Similar considerations apply to the other filter and to the corresponding valves and control.

This embodiment allows a more cost-effective implementation of the invention and leads the opening and closing of the first valve 11 to mechanically depend on the opening and closing of the second valve 12 for each filter. The single controls 18 related to the two filters are independent of one another.

Similar consideration for the separate control embodiment apply to the suction and cleaning operations of the single control embodiment.

What is claimed is:

1. A dust suction device for surface working tools, comprising:
   two filters;
   an air inlet chamber with an air inlet for the two filters;
   a turbine having an inlet and an outlet;
   an outlet chamber in communication with the outlet of the turbine;
   a depression chamber in communication with the inlet of the turbine;
   two intermediate chambers separated from each other being interposed between said inlet chamber and said depression chamber and separately communicating with said inlet chamber through a respective one of said filters; and
   a valve system for controlling the flow of air through said filters, said valve system comprising for each of the two intermediate chambers a first valve for controlling the communication between the intermediate chamber and the depression chamber so that an air flow from the inlet chamber passes through the respective filter during a suction step and a second valve for controlling the communication between the outlet chamber and the same intermediate chamber so that an air flow from the outlet chamber passes through said filter during a filter cleaning step,
   wherein said filters are separate planar filters laterally arranged with respect to each other and said first and second valves of each intermediate chamber are arranged to open and close alternately respective communication holes of the intermediate chamber which are laterally adjacent to each other and both faced to the filter associated with said intermediate chamber so that said air flows have parallel rectilinear paths between said communication holes and said filter.

2. The suction device according to claim 1, characterized in that each first valve is controlled by a first independent control and each second valve is controlled by a second independent control.

3. The suction device according to claim 1, characterized in that each of a pair consisting of the first valve and the second valve of one of said filters is controlled by a single control, which leads the opening and closing of each first valve of a filter to depend on the opening and closing of the second valve of the same filter, and the single control of each of said pairs of valves are independent of one another.

4. The suction device according to claim 2, characterized in that said controls are of the solenoid type.

5. The suction device according to claim 3, characterized in that said controls are of the solenoid type.

6. The suction device according to claim 2, characterized in that said controls are operated by an electronic control unit.

7. The suction device according to claim 3, characterized in that said controls are operated by an electronic control unit.

8. The suction device according to claim 4, characterized in that said controls are operated by an electronic control unit.

9. The suction device according to claim 5, characterized in that said controls are operated by an electronic control unit.

10. The suction device according to claim 6, characterized in that the opening and closing of the first valves and of the second valves for cleaning the filters is actuated according to a response from a sensor.

11. The suction device according to claim 7, characterized in that the opening and closing of the first valves and of the second valves for cleaning the filters is actuated according to a response from a sensor.

12. The suction device according to claim 8, characterized in that the opening and closing of the first valves and of the second valves for cleaning the filters is actuated according to a response from a sensor.

13. The suction device according to claim 9, characterized in that the opening and closing of the first valves and of the second valves for cleaning the filters is actuated according to a response from a sensor.

14. The suction device according to claim 6, characterized in that the opening and closing of the first valves and of the second valves for cleaning the filters is actuated after a certain predetermined time of continuous operation.

15. The suction device according to claim 7, characterized in that the opening and closing of the first valves and of the second valves for cleaning the filters is actuated after a certain predetermined time of continuous operation.

16. The suction device according to claim 8, characterized in that the opening and closing of the first valves and of the second valves for cleaning the filters is actuated after a certain predetermined time of continuous operation.

17. The suction device according to claim 9, characterized in that the opening and closing of the first valves and of the second valves for cleaning the filters is actuated after a certain predetermined time of continuous operation.

18. The suction device according to claim 1, characterized in that the opening and closing of the first valves and of the second valves for cleaning the filters is actuated manually.

19. The suction device according to claim 2, characterized in that the opening and closing of the first valves and of the second valves for cleaning the filters is actuated manually.

20. The suction device according to claim 3, characterized in that the opening and closing of the first valves and of the second valves for cleaning the filters is actuated manually.

21. The suction device according to claim 4, characterized in that the opening and closing of the first valves and of the second valves for cleaning the filters is actuated manually.

22. The suction device according to claim 5, characterized in that the opening and closing of the first valves and of the second valves for cleaning the filters is actuated manually.

* * * * *